US011181041B2

(12) United States Patent
Smith et al.

(10) Patent No.: US 11,181,041 B2
(45) Date of Patent: Nov. 23, 2021

(54) HEAT RECOVERY STEAM GENERATOR WITH ELECTRICAL HEATER SYSTEM AND METHOD

(71) Applicant: General Electric Company, Schenectady, NY (US)

(72) Inventors: Gordon Raymond Smith, Ballston Spa, NY (US); Allen Michael Pfeffer, Windsor Locks, CT (US); Robert John Gdaniec, Ballston Lake, NY (US)

(73) Assignee: General Electric Company, Schenectady, NY (US)

(*) Notice: Subject to any disclaimer, the term of this patent is extended or adjusted under 35 U.S.C. 154(b) by 953 days.

(21) Appl. No.: 15/423,511

(22) Filed: Feb. 2, 2017

(65) Prior Publication Data

US 2018/0216496 A1 Aug. 2, 2018

(51) Int. Cl.
*F02C 3/04* (2006.01)
*F22B 1/28* (2006.01)
*F22B 1/18* (2006.01)
*F01K 23/10* (2006.01)
*F01K 13/02* (2006.01)
*F01K 7/16* (2006.01)

(52) U.S. Cl.
CPC ............... *F02C 3/04* (2013.01); *F01K 13/02* (2013.01); *F01K 23/101* (2013.01); *F01K 23/103* (2013.01); *F22B 1/1815* (2013.01); *F22B 1/28* (2013.01); *F01K 7/16* (2013.01); *F05D 2220/62* (2013.01); *Y02E 20/14* (2013.01); *Y02E 20/16* (2013.01)

(58) Field of Classification Search
CPC . F02C 3/04; F01K 3/02; F01K 23/101; F01K 23/103; F01K 7/16; F22B 1/1815; F22B 1/28; F05D 2220/62; Y02E 20/14; Y02E 20/16; F02G 5/02
See application file for complete search history.

(56) References Cited

U.S. PATENT DOCUMENTS

| | | | | |
|---|---|---|---|---|
| 3,423,293 A | * | 1/1969 | Holden | B01D 1/2884 202/172 |
| 3,965,675 A | * | 6/1976 | Martz | F01K 23/108 60/39.182 |
| 4,391,101 A | * | 7/1983 | Labbe | B01D 19/0047 60/646 |
| 4,455,614 A | * | 6/1984 | Martz | F01K 23/10 290/40 R |
| 8,276,382 B2 | | 10/2012 | Hu et al. | |
| 2012/0011865 A1 | * | 1/2012 | Ivison | F24F 5/0007 62/79 |
| 2013/0047613 A1 | * | 2/2013 | Holt | F01K 13/02 60/645 |
| 2013/0176418 A1 | * | 7/2013 | Pandey | H04N 5/33 348/83 |

(Continued)

*Primary Examiner* — Ehud Gartenberg
*Assistant Examiner* — Henry Ng
(74) *Attorney, Agent, or Firm* — Fletcher Yoder, P.C.

(57) ABSTRACT

A system includes a turbine system that contains a heat recovery steam generator (HRSG) having a flow path that receives an exhaust gas, and having a fluid path that receives a fluid. The fluid path is adjacent to the flow path such that the fluid is heated by the exhaust gas. The HRSG includes an electrical heater that provides heat to the fluid path during a start-up mode of the HRSG, during a shutdown mode of the HRSG, or both.

19 Claims, 4 Drawing Sheets

(56) References Cited

U.S. PATENT DOCUMENTS

| | | | | |
|---|---|---|---|---|
| 2014/0137555 A1* | 5/2014 | Del Campo | ............ | F01K 13/02 |
| | | | | 60/646 |
| 2014/0150438 A1* | 6/2014 | Ellis | ......................... | F02C 9/26 |
| | | | | 60/772 |
| 2014/0203557 A1* | 7/2014 | Kim | ....................... | F01K 23/10 |
| | | | | 290/2 |
| 2014/0331683 A1* | 11/2014 | Mazzaro | ................... | F02C 6/18 |
| | | | | 60/772 |
| 2014/0366538 A1* | 12/2014 | Deister | .................. | F01D 25/26 |
| | | | | 60/646 |
| 2017/0101899 A1* | 4/2017 | Sykes | ..................... | F01D 11/24 |
| 2019/0301309 A1* | 10/2019 | Huntington | .............. | F01K 3/18 |

* cited by examiner

HEAT RECOVERY STEAM GENERATOR WITH ELECTRICAL HEATER SYSTEM AND METHOD

BACKGROUND OF THE INVENTION

The subject matter disclosed herein relates to heat recovery steam generator (HRSG) systems and methods. More specifically, the invention relates to systems and methods utilized during, for example, a start-up and/or shutdown (e.g., idle) mode of the HRSG.

During a normal operating mode of a HRSG, the HRSG may utilize exhaust gases from a gas turbine engine to heat a fluid (e.g., a liquid, such as water) flowing through the HRSG (e.g., to convert water into steam). During a start-up mode of the HRSG, the liquid (e.g., water) routed through the HRSG may be heated along portions of the HRSG toward an operating temperature of the liquid (e.g., corresponding with the normal operating mode of the HRSG). Unfortunately, the start-up mode for traditional configurations may be lengthy and inefficient, which may waste resources and cause excess emissions that may otherwise be treatable at higher temperatures (e.g., normal operating temperature). Accordingly, improved start-up and/or shutdown modes of a HRSG are suitable for operation.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine system that contains a heat recovery steam generator (HRSG) having a flow path that receives an exhaust gas, and having a fluid path that receives a fluid. The fluid path is adjacent to the flow path such that the fluid is heated by the exhaust gas. The HRSG includes an electrical heater that provides heat to the fluid path during a start-up mode of the HRSG, during a shutdown mode of the HRSG, or both.

In a second embodiment, an apparatus includes a heat recovery steam generator (HRSG) that contains a flow path that receives an exhaust gas, a structure encompassing a fluid path that receives a fluid and enables heating of the fluid by the exhaust gas, and a electrical heater located adjacent the structure and heats the fluid while the HRSG is in a shutdown mode, while the HRSG is in a start-up mode, or both.

In a third embodiment, a control system of a heat recovery steam generator (HRSG) includes a valve configured to receive a fluid after the fluid passes through a fluid path of the HRSG. The control system also includes at least one controller configured to instruct an electrical heater to provide heat to the fluid path during a start-up mode of the HRSG, a shutdown mode of the HRSG, or both, and to instruct the valve to direct the fluid towards a first process or a second process different than the first process.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
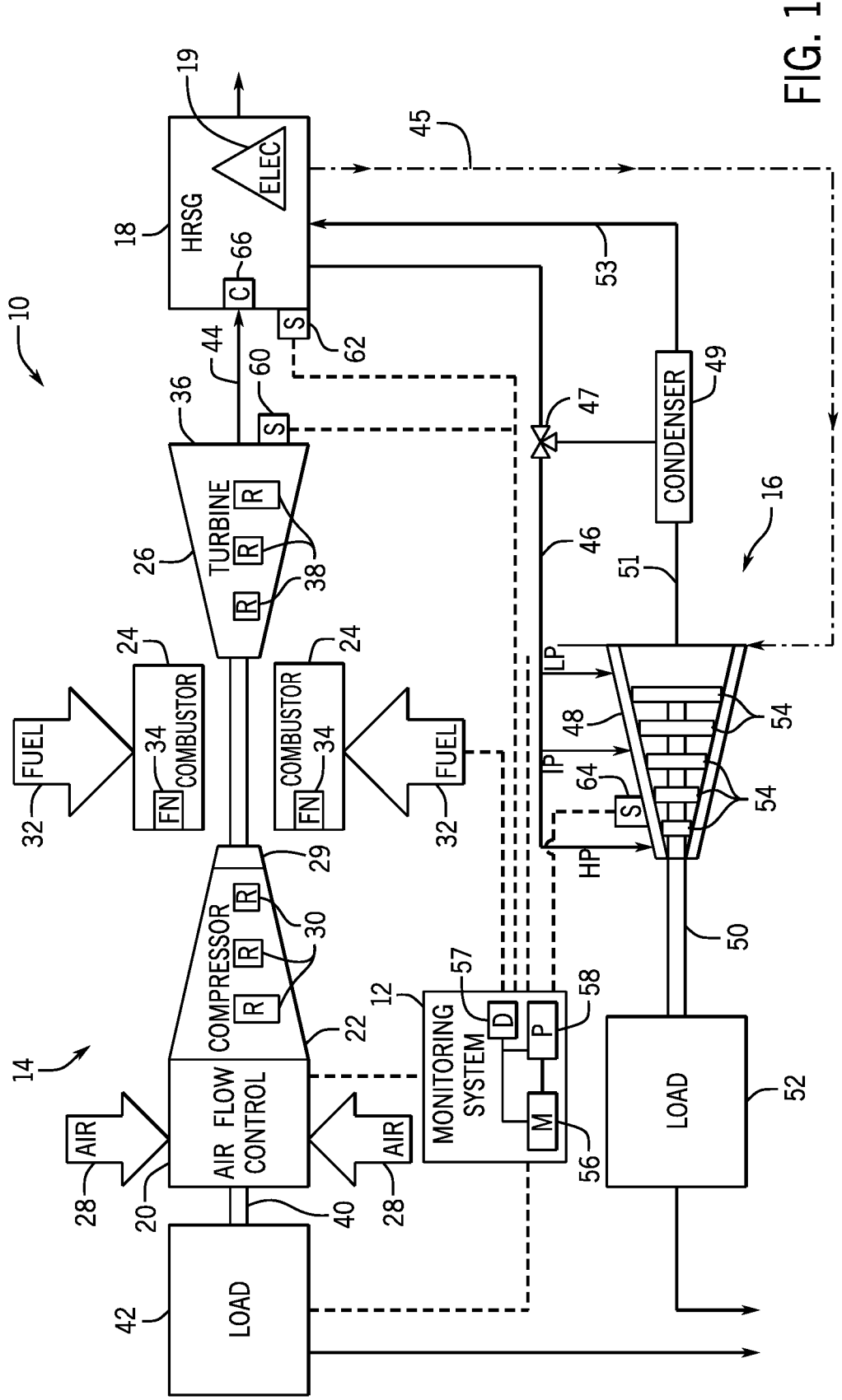
FIG. 1 is a schematic diagram illustrating an embodiment of a combined cycle power plant (CCPP) having a HRSG containing an electrical heating system, in accordance with an aspect of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure include a process of providing heat to a heat recovery steam generator (HRSG) via an electrical heating component (e.g., during a start-up and/or shutdown or idle mode of the HRSG). For example, a combined cycle power plant (CCPP) may include at least a gas turbine, a steam turbine, and the HRSG. An exhaust from the gas turbine engine may be utilized by the HRSG to heat a fluid (e.g., a liquid, such as water) to generate steam, where the steam may then used by the steam turbine to generate power. In other words, the HRSG may include a first flow path that receives the exhaust gas, may include a second flow path that receives the water, and may include the first flow path positioned adjacent to the second flow path such that heat is transferred from the exhaust gas to the water.

During the start-up mode of the HRSG, the HRSG may receive the water (or some other fluid), and an electrical heater may apply heat to the water. Further, the electrical heater may apply the heat to the water during a shutdown (e.g., idle) mode of the HRSG (e.g., while the HRSG is not in the start-up or normal operating modes, and/or while the HRSG does not receive any exhaust gas from the gas turbine engine). It should be noted that, during the start-up and/or shutdown (e.g., idle) modes, the electrical generator may also heat a portion of a structure of the HRSG to correspond with a temperature of the water, thereby reducing energy loss through the portion of the structure of the HRSG. In general, the electrical heater provides heat to the water (and to the structure of the HRSG) during the start-up mode and/or the shutdown mode to prepare the water for receiving heat from the exhaust gas of the gas turbine engine. By controlling the temperature of the water prior to the water being heated by the exhaust gas, an efficiency of the HRSG may be improved. It should be noted that "shutdown mode" or "idle mode" used hereinafter may refer to a period during which exhaust gases are not passed from the turbine of the gas turbine engine to the HRSG, and that "start-up mode" used hereinafter may refer to a period during which exhaust gas is passed form the turbine to the HRSG, but prior to the system reaching normal operating conditions (e.g., temperature, pressure, etc.). In other words, "shutdown" and "start-up" refer to the primary functionality of the HRSG (e.g., producing primary steam for use by a steam turbine), but the HRSG may be utilized for other functionality during the shutdown mode, the start-up mode, or both (e.g., to produce auxiliary steam).

In some embodiments, a catalyst may receive the exhaust gas in (or proximate to) the HRSG (e.g., to reduce emissions). However, the catalyst may only be effective if the exhaust gas includes a temperature within a particular temperature range (e.g., or above a temperature threshold), where the particular temperature range (e.g., or the particular temperature threshold) of the exhaust gas is at least partially dependent on the starting temperature of the water being heated by the exhaust gas (e.g., just prior to being heated by the exhaust gas). For example, if the starting temperature of the water is too low, the water may extract too much heat from the exhaust gas, causing the exhaust gas to have a temperature lower than the particular range or the particular threshold required of the catalyst. Further, the amount of heat required to generate steam is increased if the starting temperature of the water is low.

By pre-heating the water routed through the HRSG with the electrical heater (e.g., during the start-up and/or shutdown modes via the electrical heater), the water may more quickly reach a high enough temperature, thus enabling the exhaust gas to maintain a temperature suitable for emissions-reduction by the catalyst. Accordingly, the catalyst may more quickly be utilized effectively, thereby reducing emissions over embodiments that do not include a preheater. Further, by pre-heating the water routed through the HRSG with the electrical heater prior to the water being heated by the exhaust gas, less energy is transferred between the exhaust gas and the water, thereby reducing a thermal stress on the HRSG structure that may otherwise occur if not for pre-heating. It should be noted that, because the water is pre-heated by the electrical heater prior to the water being heated by the exhaust gas, the water may be in a vapor or steam form prior to being heated by the exhaust gas. However, the quality (e.g., temperature and/or pressure) of the water (e.g., in the vapor or steam form prior to being heated by the exhaust gas) may be such that additional heating prior to delivering the steam to the steam turbine of the CCPP may enhance overall functionality.

In some embodiments (e.g., during the shutdown mode), the electrical heater may continue to heat the water routed through the HRSG, as described above. Further, as previously described, the electrical heater may heat the water such that the water reaches a vapor or steam form during the shutdown mode (and, in some embodiments, during the start-up mode). At least some of the vapor or steam generated during the shutdown mode and, in some embodiments, during the start-up mode, may be exported as auxiliary steam to a secondary process (e.g., for sealing portions of the aforementioned steam turbine or gas turbine, such as a plenum of the steam turbine or gas turbine, or for sealing portions of another system, such as a radiant syngas cooler). In this way, the HRSG may serve as an auxiliary steam generator during the shutdown mode and/or start-up mode, in addition to serving as a primary steam generator for the steam turbine (e.g., during the normal operating mode). It should be noted that the required power/temperature output of the disclosed electrical heating systems (e.g., during start-up mode and/or shutdown mode) to enable secondary steam export and earlier use of the catalyst may be substantially higher than would be required to provide freeze protection.

By way of introduction, FIG. 1 is a schematic diagram of an embodiment of a combined cycled power plant (CCPP) 10. In the illustrated embodiment, the CCPP 10 includes a gas turbine system 14, a steam turbine system 16, and a heat recovery steam generator (HRSG) 18 disposed between the gas turbine system 14 and the steam turbine system 16. The HRSG 18 is generally configured to enable heat transfer from an exhaust gas 44 of the gas turbine system 14 to a fluid (e.g., water 53) of the steam turbine system 16, thereby generating steam 46 for use in the steam turbine system 16. These and other features will be described in detail below.

The gas turbine system 14 may include an airflow control module 20, a compressor 22, a combustor 24, and a turbine 26. In operation, an oxidant 28 (e.g., air, oxygen, oxygen enriched air, or oxygen reduced air) enters the turbine system 14 through the airflow control module 20, which controls the amount of oxidant flow (e.g., airflow). The airflow control module 20 may control airflow by heating the oxidant flow, cooling the oxidant flow, extracting airflow from the compressor 22, using an inlet restriction, using an inlet guide vane, or a combination thereof. As the air passes through the airflow control module 20, the air enters the compressor 22. The compressor 22 pressurizes the air 28 in a series of compressor stages (e.g., rotor disks 30) with compressor blades. After the air 28 is pressurized, the pressurized air may reside in a compressor discharge chamber 29 before the compressed air exits the compressor 22.

As the compressed air exits the compressor 22, the air enters the combustor 24 and mixes with a fuel 32. The turbine system 14 may use liquid or gas fuel, such as natural gas and/or a hydrogen rich synthetic gas, to run the turbine system 14. For example, the fuel nozzles 34 may inject a fuel-air mixture into the combustor 24 in a suitable ratio for optimal combustion, emissions, fuel consumption, and power output. As depicted, multiple fuel nozzles 34 intakes the fuel 32, mixes the fuel 32 with air, and distributes the air-fuel mixture into the combustor 24. The air-fuel mixture combusts in a combustion chamber within combustor 24, thereby creating combustion products. The combustor 24 directs the combustion products through a turbine 26 toward an exhaust outlet 36. As the combustion products pass through the turbine 26, the combustion products contact turbine blades attached to turbine rotor disks 38 (e.g., turbine stages). As the combustion products travel through the turbine 26, the exhaust gases may force turbine blades to rotate the rotor disks 38. The rotation of the rotor disks 38 induces rotation of at least one shaft 40, and of the rotor disks 30 in the compressor 22 (e.g., which may be rotatably coupled with the shaft 40). A load 42 (e.g., electrical generator) connects to the shaft 40 and uses the rotation energy of the shaft 40 to generate electricity for use by a power grid. After the turbine 26 extracts energy from the combustion products, the combustion products expand and become exhaust gas 44, and the exhaust gas 44 exits the turbine 26 through the exhaust gas outlet 36.

The exhaust gas 44 may then be routed from the exhaust gas outlet 36 (e.g., of the turbine 26) to a first flow path of the HRSG 18. In general, the HRSG 18 may also receive, in a second flow path, a fluid (e.g., water 53) from the steam turbine system 16. The first flow path and the second flow path may be disposed adjacent to each other. Accordingly, the water 53 may be heated by the exhaust gas 44 until the water 53 is converted to steam 46 (e.g., for use in the steam turbine system 16).

As shown, in accordance with present embodiments, the HRSG 18 may contain an electrical heating system 19 that may provide heat to the water 53 during a start-up mode and/or during a shutdown mode of the HRSG 18. The "start-up mode" of the HRSG 18, utilized herein, refers to a period during which the HRSG 18 receives a stream of exhaust gas 44 and water 53, but the streams of exhaust gas 44 and/or water 53 may not include a steady-state operating temperature (e.g., normal operating temperature). The "shutdown mode" of the HRSG 18, utilized herein, refers to a period during which the HRSG 18 either does not receive the exhaust gas 44, or is not in the start-up mode or a normal operating mode. However, it should be noted that the HRSG 18 may be utilized to generate, for example, auxiliary steam 45 during the shutdown mode. These and other features will be described in detail below.

The electrical heating system 19 may heat the water 53 routed through the HRSG 18 during the shutdown mode and/or the start-up mode of the HRSG 18 in order to (a) more quickly reach a normal operating mode of the HRSG 18; and/or (b) generate auxiliary steam 45 for a secondary process. By more quickly reaching the normal operating mode of the HRSG 18, an efficiency of the HRSG 18 may be improved, thermal stress on a structure of the HRSG 18 may be reduced, and emissions of the HRSG 18 may be reduced. By generating auxiliary steam 45 for a secondary process (e.g., during shutdown and/or start-up modes), the HRSG 18 (and corresponding electrical heating system 19) may be utilized productively even when the CCPP 10, including the HRSG 18, is not in a normal operating mode.

Continuing with the illustrated embodiment, the primary steam 46 generated by the HRSG 18 (e.g., during the normal operating mode) and described above may be routed to the steam turbine system 16. The steam turbine system 16 may include a turbine 48, a shaft 50, and a load 52 (e.g., electrical generator). As the hot pressurized steam 46 enters the steam turbine 48, the steam 46 contacts turbine blades attached to turbine rotor disks 54 (e.g., turbine stages). As the steam 46 passes through the turbine stages in the turbine 48, the steam 46 induces the turbine blades to rotate the rotor disks 54. The rotation of the rotor disks 54 induces rotation of the shaft 50. As illustrated, the load 52 (e.g., electrical generator) connects to the shaft 50. Accordingly, as the shaft 50 rotates, the load 52 (e.g., electrical generator) uses the rotation energy to generate electricity for the power grid. As the pressurized steam 46 passes through the turbine 48, the steam 46 loses energy (i.e., expands and cools). After exiting the steam turbine 48, the steam exhaust 51 enters a condenser 49 before being routed back to the HRSG 18, where the steam exhaust 51 may become liquid water 53 that is then reheated (e.g., at the HRSG 18) for reuse in the steam turbine system 16.

As shown, the CCPP 10 may also include a monitoring system 12 that monitors operations performed by the CCPP 10. In some embodiments, the monitoring system 12 may be incorporated into (or include) a controller of the CCPP 10 to control the operations performed by the CCPP 10 (e.g., increasing power output or decreasing power output from the gas turbine system 14 and/or the steam turbine system 16 of the CCPP 10). In a similar manner, the monitoring system may control the operations performed by the electrical heating system 19. Generally, the monitoring system 12 may include a memory 56, display 57, and a processor 58. The memory 56 includes tangible, non-transitory, computer-readable media that stores instructions and steps written in software code. The display 57 may include a liquid crystal display (LCD), an electroluminescent display (ELD), a cathode ray tube display (CRT), and/or a light emitting diode (LED) display among many other display options for relaying information about the CCPP 10. The processor 58 executes the stored instructions in response to data received from the CCPP 10. More specifically, the monitoring system 12 may be incorporated in a controller that controls and communicates with various components in the CCPP 10 in order to flexibly control the loading of the gas turbine system 14, and thus the loading of the steam turbine system 16. As illustrated, the controller may control the airflow control module 20, the intake of fuel 32, valve(s) 47, and a catalyst 66. Further, the monitoring system 12 may communicate with the load 42.

The combined cycle power plant 10 may also include various sensors for detecting and/or deriving various conditions within or around the combined cycle plant 10. For example, the sensors may measure temperatures at various locations using various temperature sensors, such as exhaust gas temperature sensor 60, HRSG steam temperature sensor 62, and steam turbine metal temperature sensor 64, and the like. Additionally or alternative, the sensors of the combined cycle power plant 10 may pertain to other operating parameters, such as pressure, vibration, flow rates, knocks within the combined cycle power plant 10, valve detection (open or closed), speed, stress or strain, and/or other suitable parameters that may be measured indicating operation of the combined cycle power plant 10.

In accordance with present embodiments, the controller (e.g., the monitoring system 12) may receive data from the various sensors 60, 62, 64. The controller may determine, based at least in part on a portion of the data collected by one or more of the sensors 60, 62, 64, when the exhaust gas 44 is at an appropriate temperature for utilizing catalysts (e.g., to reduce emissions of the exhaust gas 44). In other words, the controller may determine when the CCPP 10 (or corresponding HRSG 18) has reached a normal operating mode based at least in part on a temperature of, for example, the exhaust gas 44 (or of a component of the HRSG 18, or the water routed through the HRSG 18, either of which may be indicative of the temperature of the exhaust gas 44). Once the temperature of the exhaust gas 44 and/or water 53 is appropriate (e.g., following the pre-heating process describe above and below), the catalyst 66 may become effective. However, in some embodiments, certainly catalysts 66 (or corresponding parts) may require control by the monitoring system 12. For example, the catalyst 66 (e.g., SCR catalyst) may require injection of ammonia (or other reagent) into the exhaust gas 44. Accordingly, the monitoring system 12 (or controller thereof) may receive sensor feedback indicative of a temperature of the exhaust gas 44, and may instruct the catalyst 66 (or a corresponding component upstream of the catalyst 66) to inject the ammonia (or other reagent).

As previously described, the electrical heater 19 (and the CCPP's use thereof in accordance with the present disclosure) may cause the exhaust gas 44 to reach the normal operating temperature more quickly than traditional embodiments, thereby facilitating earlier use of the catalyst 66. Reaching the normal operating mode earlier may increase an efficiency of the CCPP 10, and earlier use of the catalyst 66 may reduce emissions of the CCPP 10. It should be noted that the required power/temperature output of the disclosed electrical heating systems (e.g., during start-up mode and/or shutdown mode) to enable secondary steam export and earlier use of the catalyst 66 to the exhaust gas may be substantially higher than would be required to provide freeze protection.

Figure 2:
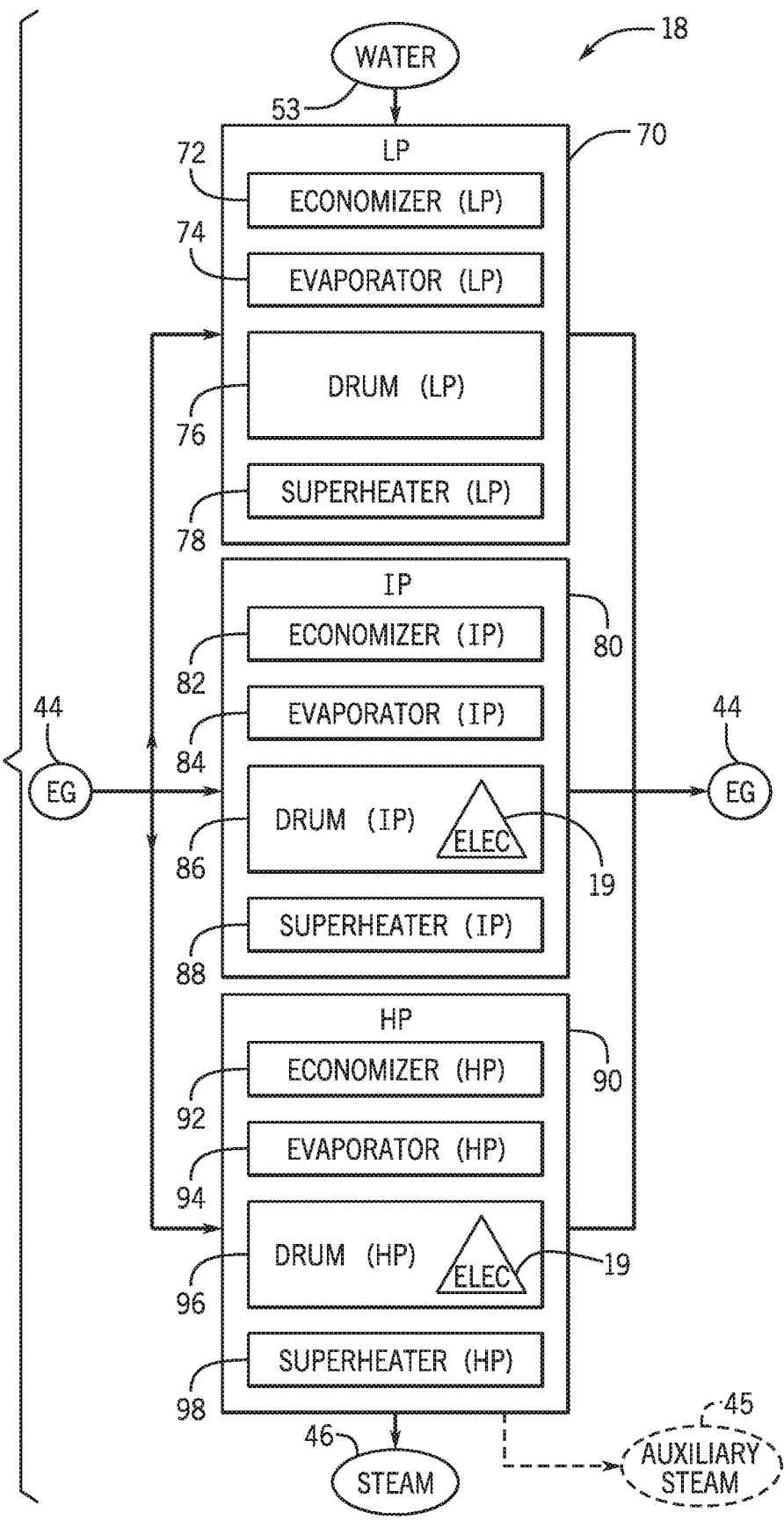
FIG. 2 is a schematic diagram illustrating an embodiment of a HRSG containing a high-pressure section with an electrical heating system, an intermediate-pressure with an electrical system, and a low-pressure section, for use in the CCPP of FIG. 1, and in accordance with an aspect of the present disclosure.

FIG. 2 is a schematic diagram illustrating the HRSG 18 containing a low-pressure section 70, an intermediate-pressure section 80 with one of the electrical heating systems 19, and a high-pressure section 90 with one of the electrical heating systems 19. It should be noted that, in some embodiments, a single electrical heating system 19 may be utilized across both the intermediate-pressure and high-pressure sections 80, 90. Further, it should be noted that the electrical heating system(s) 19 may be integral with a structure of the HRSG 18 (e.g., incorporated within or attached to the HRSG 18), or the electrical heating system(s) 19 may be external to the HRSG 18 (e.g., separate from the HRSG 18), or a combination thereof. Further still, in some embodiments, the low-pressure section 70 may include one of the electrical heating systems 19, or may share the electrical heating system 19 with one or more of the other sections 80, 90 of the HRSG 18.

The components of the HRSG 18 in the illustrated embodiment are simplified and are not intended to be limiting. Rather, the illustrated HRSG 18 is shown to convey the general operation of certain HRSG systems. As discussed above, exhaust gas 44 may be routed into the HRSG 18 via a first flow path and used to heat water 53 (e.g., to generate steam 46), where the water 53 is routed to the HRSG 18 via a second flow path. The exhaust gas 44 may heat the water 53 in the low-pressure section 70, the intermediate-pressure section 80, and the high-pressure section 90 of the HRSG 18.

As illustrated in no particular order, the low pressure (LP) section 70 includes an LP economizer 72, an LP evaporator 74, an LP drum 76, and an LP superheater 78. The LP economizer 72 may be a device configured to pre-heat the water 53 to prepare the water 53 for receiving heat from the exhaust gas 44. For example, economizers may generally pre-heat the water 53 to an ideal temperature for controlling an amount of heat required to generate the steam 46. The LP economizer 72 may then direct the pre-heated water 53 to other components of the HRSG 18, for example, the LP drum 76. The LP drum 76 may be storage container that feeds the water 53 to the LP evaporator 74. The LP evaporator 74 may receive the pre-heated water 53 to further heat it the water 53 to generate steam 46 (e.g., the pre-heated water 53 may experience a phase change from a liquid to a gas inside the evaporator). In some embodiments, the water 53 may be in a vapor form before, during, or after being heated by the exhaust gas 44 in the LP evaporator 74. The steam 46 may then be received by the LP superheater 78, which may convert saturated steam produced by the LP evaporator 74 into superheated or dry steam (e.g., the steam 46).

As illustrated, the intermediate-pressure (IP) section 80 may include an IP economizer 82, an IP evaporator 84, an IP drum 86, an IP superheater 88, and an electrical heating system 19. The IP economizer 82, the IP evaporator 84, the IP drum 86, and the IP superheater 88 may have similar functionality as the LP economizer 72, the LP evaporator 74, the LP drum 76, and the LP superheater 78, respectively. However, in the illustrated embodiment, unlike the LP section 70, the IP section 80 contains an electrical heating system 19 configured to supply heat to the IP section 80 during, for example, a start-up mode and/or a shutdown mode of the HRSG 18 (or the corresponding CCPP). In some embodiments, the electrical heating system 19 may replace the IP economizer 82. As mentioned above, the "start-up mode" of the HRSG 18 refers to a period during which the HRSG 18 receives a stream of exhaust gas 44 and water 53, but the streams of exhaust gas 44 and/or water 53 may not have reached a steady-state normal operating temperature. The "shutdown mode" of the HRSG 18, utilized herein, refers to a period during which the HRSG 18 either does not receive the exhaust gas 44, or is not in the start-up mode or the normal operating mode.

While in the start-up mode, the electric heating system 19 may reduce the time it takes for the HRSG 18 to reach normal operating conditions (e.g., temperature, pressure, etc.). In addition, during the shutdown (e.g., idle) mode, the electric heating system 19 may continue to heat the water 53 in order to generate an auxiliary steam 45. In some embodiments, the controller (e.g., monitoring system 12) may control a power or temperature output (e.g., setting) of the electric heating system 19 to correspond with the shutdown mode, the start-up mode, and/or the normal operating mode. For example, a first power or temperature output of the electric heating system 19 may be instructed by the controller during the shutdown mode, a second power or temperature output of the electric heating system 19 may be instructed by the controller during the start-up mode, a third temperature output of the electric heating system may be instructed by the controller during the normal operating mode, or a combination thereof. In some embodiments, control by the controller may be based on the operating conditions alone, and the controller may instruct the power or temperature output of the electric heating system 19 on a sliding scale. In other words, in some embodiments, the electric heating system 19 may include a power or temperature output setting that can be fine-tuned based on detected operating parameters (e.g., temperature, pressure, etc.) as opposed to a pre-determined setting for each mode of the HRSG 18. In general, the controller may instruct a power or temperature output of the electrical heating system 19 conducive to the desired technical effect(s) of the HRSG 18 at that time. The power input to an evaporator (e.g., from the power output of the electrical heater) during pre-heating (e.g., during start-up mode), in certain embodiments, may range between 1 megawatt and 5 megawatts.

As illustrated, the high-pressure (HP) section 90 includes an economizer 92, an evaporator 94, a drum 96, a superheater 98, and an electrical heating system 19. The HP economizer 92, the HP evaporator 94, the HP drum 96, and the HP superheater 98 may have similar functionality as the LP economizer 72, the LP evaporator 74, the LP drum 76, and the LP superheater 78, respectively. Unlike the LP section 70, but similar to the IP section 80, the HP section 90 contains an electrical heating system 19 adjacent the HP evaporator 94 and/or HP drum 96 configured to supply heat to the exhaust gas 44 routed through the HP section 90. As previously described, in some embodiments, the electrical heating system 19 may replace the HP economizer 92. Further, as previously described, the electrical heating system 19 of the IP section 80 may be shared between the IP section 80 and the HP section 90, or the IP section 80 may include a separate one of the electrical heating systems 19. In embodiments having separate electrical heating systems 19, the electrical heating system 19 of the HP section 90 may function similarly as the electrical heating system 19 of the IP section 80.

As previously described, in general, the electrical heating system(s) 19 described above may provide several technical benefits over traditional embodiments. For example, first, the electrical heating system 19 is capable of pre-heating the water 53 during a start-up mode and/or shutdown mode to more quickly ready the HRSG 18 (and, more specifically, an exhaust gas routed through the HRSG), such that a catalyst becomes effective earlier during start-up (e.g., for reducing emissions). The electrical heating system 19 may be more effective than traditional embodiments (e.g., having an auxiliary boiler for pre-heating) for several reasons. For example, first, the electrical heating system 19 may be operated during the start-up mode and/or shutdown mode of the HRSG 18, such that the water 53 is at an ideal temperature for a quick start-up of the HRSG 18. Indeed, because heat is emitted from the electrical heating system 19 as pure energy that does not require a mass flow of steam, the electrical heating system 19 is more efficient than an auxiliary boiler, where the mass flow of steam of the auxiliary boiler would otherwise (a) cause energy loss; and (b) cause condensation within the HRSG 18, requiring periodic water removal from the HRSG 18. Further still, as previously described, the electrical heating system 19 may enable generation of an auxiliary steam 46 for a secondary process during the shutdown mode of the HRSG 18 (e.g., while the HRSG 18 does not receive the exhaust gas 44, or while the HRSG 18 does not produce the primary steam 45). For example, the auxiliary steam 46 may be utilized for sealing purposes (e.g., for components of the CCPP).

Figure 3:
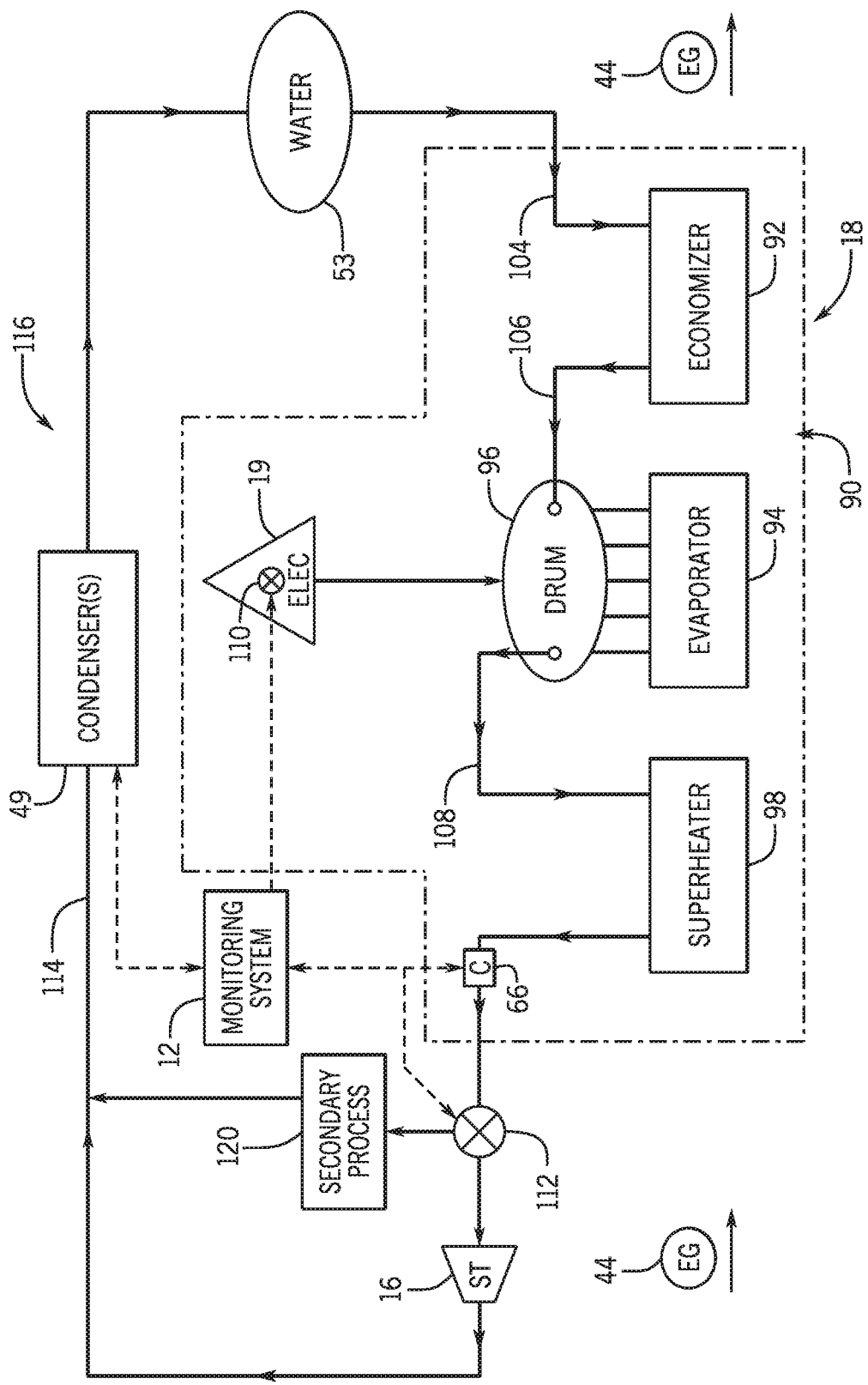
FIG. 3 is a schematic diagram illustrating an embodiment of one of the HRSG sections of FIG. 2 interacting with a steam turbine, in accordance with an aspect of the present disclosure.

FIG. 3 is a schematic diagram 116 illustrating an embodiment of one of the sections of the HRSG 18 with the steam turbine system 16. In the illustrated embodiment, the HP section 90 of the HRSG 18 is shown to illustrate how the electrical heating system 19 interacts within a section of the HRSG 18 (e.g., during a start-up and/or shutdown mode). Additionally, FIG. 3 includes an illustration of the order by which the components of the HRSG 18 receive the water 53. It should be appreciated that, in some embodiments, the same or similar schematic diagram of FIG. 3 may be applicable to the LP and/or IP sections of the HRSG 18.

As discussed above, exhaust gas 44 (e.g., from a gas turbine) is fed into the HRSG 18 via a first flow path (e.g., to heat water 53). The water 53 is fed into the economizer 92 via a second fluid flow path (referred to herein as the "fluid flow path 104") (e.g., a piping network, baffles, etc.), then into the drum 96 via flow path 106, then into the superheater 98 via flow path 108. The power output of the electrical heating system 19 may be directed toward the drum 96, the evaporator 94, or any combination thereof, or some other component of the HRSG 18, to heat the water 53 (e.g., pre-heat the water during a start-up mode and/or shutdown mode of the HRSG 18).

Additionally, as illustrated, a power controller 110 (which may be a part of the monitoring system 12 of FIG. 1) may be utilized to control, modify, and/or relay a suitable power output to the component(s) of the HP section 90 of the HRSG 18. The power controller 110 may be incorporated with, or separate from, the electrical heating system 19. For example, as previously described, the power controller 110 may enable suitable supply of power from the electrical heating system 19 to any component of the HRSG (e.g., evaporator 94, drum 96, etc.) while the HRSG 18 is in the start-up mode, the shutdown mode, and in some embodiments the normal operating mode. As such, a different output may be utilized depending on the mode of the HRSG 18, or depending on operating conditions of the HRSG 18. For example, a first temperature may be instructed during the start-up mode, such that the start-up time is reduced. A second temperature different than the first temperature may be instructed during the shutdown mode, such that auxiliary steam may be produced, and such that the start-up time may be reduced when the HRSG 18 enters the start-up mode (e.g., because the water 53 is already at a higher temperature than would otherwise by possible without heating the water 53 during the shutdown mode). Be reducing the start-up time, the HRSG 18 may be more efficient, and emissions-reducing catalysts (e.g., included in the catalyst supply 66) that require a particular temperature may be utilized earlier.

The steam (e.g., steam 45 or 46 from FIG. 3, depending on the operating mode of the HRSG 18) may leave the superheater 98, and may be directed toward a primary process (e.g., during normal operating mode) or a secondary process 120 (e.g., during shutdown mode) by a flow directing device 112 (e.g., three-way valve). As illustrated, the primary process may include providing steam to the steam turbine system 16 for driving the steam turbine. The secondary process 120 may be any process that may be enhanced with the use of auxiliary steam. For example, the secondary process 120 may include providing the auxiliary steam as a sealing means for the steam turbine of the steam turbine system 16, among other uses. The steam turbine of the steam turbine system 16 exhausts excess fluid (e.g., water) via flow path 114 towards one of the condenser(s) 49, which condenses the water 53 toward a liquid form. It should be noted that there may be more than one condenser (e.g., condenser(s) 49). For example, a first condensing unit (e.g., first condenser) of the condenser 49 may be configured to receive fluid from the steam turbine system 16 (e.g., where the fluid comes from steam utilized to drive the steam turbine system 16, and the steam comes from the HRSG 18), and a second condensing unit (e.g., second condenser) of the condenser 49 may be configured to receive fluid from a secondary process 120 (e.g., where the fluid comes from steam utilized, for example, to seal a plenum of the steam turbine 16, or some other secondary process). The first condenser may be different than the second condenser in order to compensate for temperature and/or pressure differences of the fluid received. For example, the first condenser may receive fluid that was utilized to drive the steam turbine 16, whereas the second condenser may receive fluid that was utilized for a secondary process (e.g., to seal the plenum of the steam turbine 16).

Furthermore, the monitoring system 12 described with respect to FIG. 1 may be configured to control the condenser(s) 49. For example, the monitoring system 12 may send signals (e.g., electrical signals) to receivers in the condenser(s) 49 directing the condenser(s) 49 to condense the exhaust steam received from various sources to produce water 53. In embodiments where the condenser 49 comprises a single condenser variable to accommodate different conditions of a fluid (e.g., of the primary steam and the secondary steam), the monitoring system 12 may control the condenser 49 to maintain an operating mode accommodative of the properties of the fluid received by the condenser 49 (e.g., a first operating mode accommodative of the primary steam, and a second operating mode accommodative of the secondary steam). It should be noted that, in some embodiments, some combination of control logic, valves, and/or pumps may be utilized (e.g., in lieu of multiple condensers 49) to accommodate different conditions of the steam.

As illustrated, it should be noted that the monitoring system 12 is also in communication the power controller 110, the flow directing device 112, and the utilization of the catalyst 66, thereby controlling the functionality of each of the aforementioned components of the schematic diagram 116. For example, as mentioned above, the monitoring system 12 may instruct the catalyst 66 (or corresponding component upstream of the catalyst 66) to provide the reagent (e.g., ammonia) to the exhaust gas 44 once the exhaust gas 44 reaches an ideal temperature (e.g., to enable effectiveness of the catalyst 66), although in some embodiments the catalyst 66 may not require a reagent and, thus, may be a passive component that reduces emissions once the exhaust gas 44 reaches an ideal temperature.

As a further example, as also mentioned above, the monitoring system 12 may send signals to the power controller 110 to cause the power controller 110 to enable a suitable power supply from the electrical heating system 19 to be sent to any component of the HRSG (e.g., evaporator 94, drum 96, etc.) while the HRSG 18 is in the start-up mode, the shutdown mode, and in some embodiments the normal operating mode. In another example, the monitoring system 12 may be configured to cause either the path of the exhaust gas in the flow directing diverge 112 to diverge (e.g., towards the steam turbine 16 or the secondary process 120), depending on its operating mode. As previously described, the monitoring system 12 may receive sensor feedback from sensors of any one of the components described above, where the sensor feedback may be indicative of the fluid (or other) properties described above. In other words, the monitoring system 12 (and controller thereof) may receive sensor feedback regarding (or indicative of) a temperature of the exhaust gas 44, and the monitoring system 12 may cause the catalyst 66 (or a corresponding component upstream of the catalyst 66) to provide the reagent (e.g., ammonia) to the exhaust gas 44.

Figure 4:
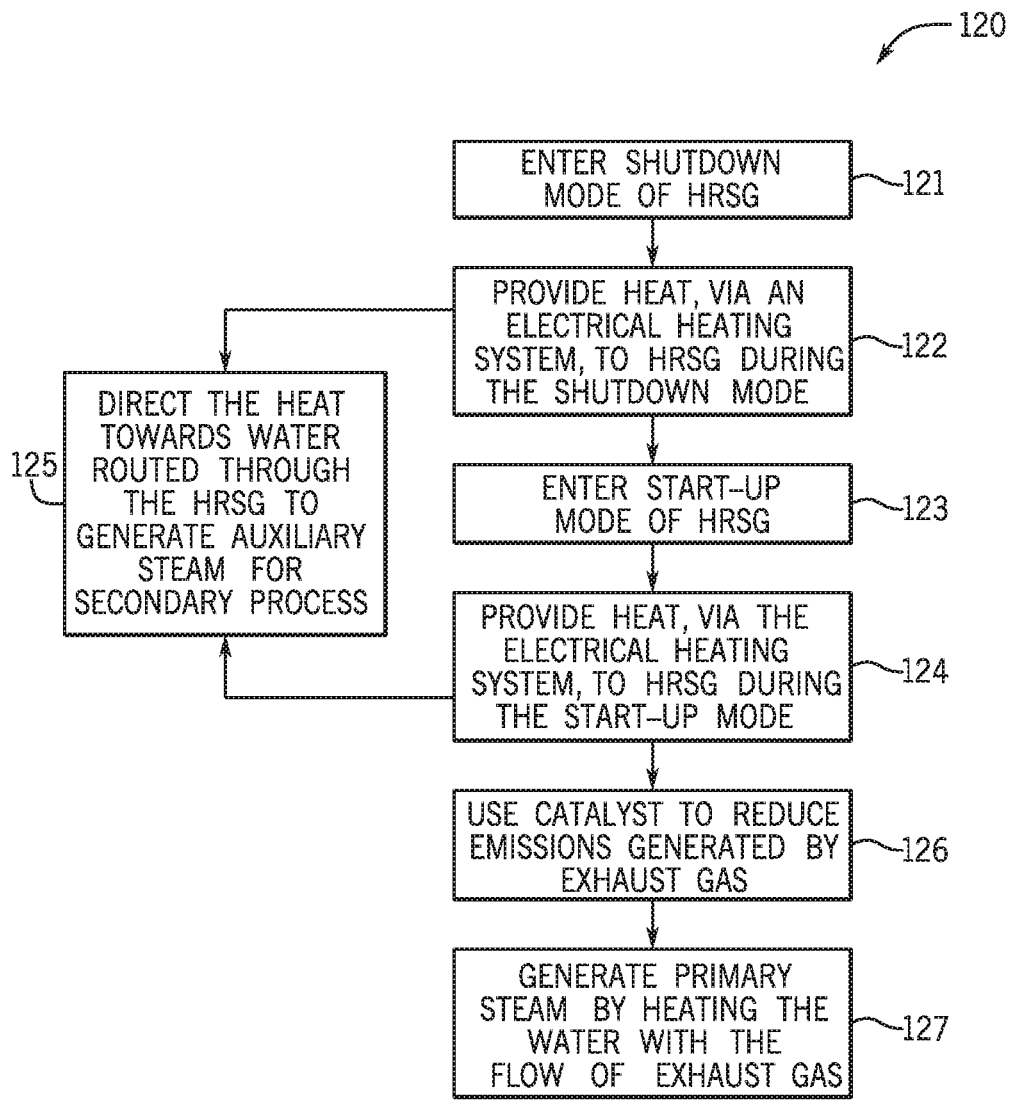
FIG. 4 is a process flow diagram illustrating an embodiment of a method whereby heat is provided to a HRSG by an electrical heating system, in accordance with an embodiment.

FIG. 4 is a process flow diagram of a method 120 whereby heat is provided to HRSG by electrical heating system, in accordance with an embodiment. For example, the illustrated method includes entering a shutdown mode (process block 121) of the HRSG, although the HRSG may already be in the shutdown mode. As previously described, "shutdown" may refer to a primary functionality, e.g., generating primary steam for driving a steam turbine. Accordingly, the primary steam for driving the steam turbine may not be generated during the "shutdown mode." However, in accordance with the description below, the HRSG may be utilized productively during the shutdown mode.

The method 120 also providing heat to the HRSG (e.g., water routed through the HRSG), via an electrical heating system during the shutdown mode (process block 122). By heating the water during the shutdown mode, the water may include a desirable starting temperature when the HRSG enters the start-up mode, which may reduce a start time of the HRSG, thereby (a) increasing an efficiency of the HRSG; and (b) enabling use of emissions-reducing catalysts, in addition to other technical effects.

Continuing with the illustrated embodiment, the method 120 includes entering the start-up mode of the HRSG (process block 123), and providing heat, via the electrical heating system, to the HRSG (e.g., to the water routed through the HRSG) during the start-up mode (process block 124). As previously described, entering the start-up mode may mean providing the exhaust gas to the HRSG (e.g., prior to the exhaust gas and the water reaching normal operating temperatures). As shown in the illustrated embodiment, the method 120 may also include directing the heat toward the water routed through the HRSG to generate auxiliary steam for use in a secondary process (e.g., during the shutdown mode, during the start-up mode, or both) (process block 125).

Further, by continuing to heat the water with the electrical heating system during the start-up mode, the water may more quickly reach an ideal temperature. By causing the water to reach an ideal temperature more quickly, the exhaust gas may also more quickly approach operating temperatures. Further, by causing the exhaust gas to more quickly approach operating temperatures, emissions-reducing catalysts may more quickly be utilized to reduce emissions of exhaust gas, thereby reducing emissions over embodiments without the electrical heating system. Accordingly, as shown in the illustrated embodiment, the method 120 includes utilizing a catalyst into to reduce emissions of exhaust gas (e.g., once the exhaust gas reaches an appropriate temperature) (process block 126).

Further still, the method 120 includes generating primary steam by heating the water with the flow of exhaust gas (process block 127). For example, as previously described, primary steam may be generated during the normal operating mode of the HRSG, and the primary steam may be utilized for driving a steam turbine. After the steam drives the steam turbine, the exhaust steam may be condensed at a condenser, and rerouted back to the HRSG.

As previously described, in general, the systems and methods described above may provide several technical benefits over traditional embodiments. For example, first, the electrical heating system is capable of pre-heating the water during a start-up mode and/or shutdown mode to more quickly ready the HRSG (and, more specifically, an exhaust gas routed through the HRSG) for use of emissions-reducing catalysts (e.g., during the start-up mode and/or normal operating mode). The electrical heating system may be more effective than traditional embodiments (e.g., having an auxiliary boiler for pre-heating) for several reasons. For example, first, the electrical heating system may be operated during the start-up mode and/or shutdown mode of the HRSG, such that the water is at an ideal temperature for a quick start-up of the HRSG. Indeed, because heat is emitted from the electrical heating system as pure energy that does not require a mass flow of steam, the electrical heating system is more efficient than an auxiliary boiler, where the mass flow of steam of the auxiliary boiler would otherwise (a) cause energy loss; and (b) cause condensation within the HRSG, requiring periodic water removal from the HRSG. Further still, as previously described, the electrical heating system may enable generation of an auxiliary steam for a secondary process during the shutdown mode of the HRSG (e.g., while the HRSG does not receive the exhaust gas, or while the HRSG does not produce the primary steam). For example, the auxiliary steam 46 may be utilized for sealing purposes (e.g., for components of the CCPP).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims

The invention claimed is:

1. A turbine system, comprising:
   a heat recovery steam generator (HRSG) having an exhaust flow path configured to receive an exhaust gas, and having a fluid path configured to receive a fluid, wherein the fluid path is adjacent the exhaust flow path such that the fluid is heated by the exhaust gas;
   an electrical heater within the HRSG, wherein the electrical heater is configured to heat the fluid in the fluid path; and
   a controller communicatively coupled to the electrical heater and configured to:
      determine whether the MSG is operating in a start-up mode, a normal operating mode, or a shutdown mode;
      control the electrical heater to a first temperature output in response to determining that the HRSG is operating in the start-up mode;
      control the electrical heater to a second temperature output in response to determining that the HRSG is operating in the normal operating mode, wherein the first temperature output is different than the second temperature output; and
      control the electrical heater to a third temperature output in response to determining that the HRSG is operating in the shutdown mode, wherein the third temperature output is different than the second temperature output.

2. The turbine system of claim 1, wherein the electrical heater is integral with a high pressure evaporator of a structure of the HRSG, an intermediate pressure evaporator of the structure of the HRSG, or a combination thereof.

3. The turbine system of claim 1, wherein the electrical heater is configured to heat the fluid in the fluid path, and the fluid is routed through a high pressure drum, a high pressure evaporator, an intermediate pressure drum, an intermediate pressure evaporator, or a combination thereof.

4. The turbine system of claim 1, wherein the electrical heater is configured to heat the fluid in the fluid path, and the fluid is routed through a low pressure drum, a low pressure evaporator, or a combination thereof.

5. The turbine system of claim 1, wherein the fluid path is configured to receive a flow of the fluid during the start-up mode, during the shutdown mode, or both, wherein the electrical heater causes the fluid to be converted from a liquid to a steam during the start-up mode, during the shutdown mode, or both, and wherein the steam is exported for use in a secondary process during the start-up mode, during the shutdown mode, or both.

6. The turbine system of claim 5, wherein the secondary process comprises providing the steam as a sealing means for a steam turbine.

7. The turbine system of claim 5, wherein the fluid path is configured to receive the flow of the fluid during the normal operating mode of the HRSG, wherein the electrical heater converts the fluid from the liquid to a primary steam during the normal operating mode, and wherein the primary steam is exported to a steam turbine to drive the steam turbine.

8. The turbine system of claim 7, wherein the controller is configured to
   instruct the HRSG to divert the steam to the secondary process, and to divert the primary steam to the steam turbine, based at least in part on whether the HRSG is operating in the start-up mode, the shutdown mode, or the normal operating mode.

9. The turbine system of claim 1, wherein the electrical heater is configured to heat the fluid path downstream an exhaust inlet along the exhaust flow path and upstream an exhaust outlet along the exhaust flow path.

10. The turbine system of claim 1, wherein the exhaust flow path comprises an exhaust inlet and an exhaust outlet, wherein the controller is configured to determine whether the HRSG receives the exhaust gas between the exhaust inlet along the exhaust flow path and the exhaust outlet along the exhaust flow path.

11. The turbine system of claim 10, wherein the controller is configured to control the electrical heater to the third temperature output in response to determining that the HRSG does not receive the exhaust gas between the exhaust inlet and the exhaust outlet.

12. A heat recovery steam generator (HRSG), comprising:
   an exhaust flow path configured to receive an exhaust gas;
   a structure encompassing a fluid path configured to receive a fluid, and to enable heating of the fluid by the exhaust gas;
   an electrical heater adjacent or within the structure and configured to heat the fluid within the fluid path; and
   a controller communicatively coupled to the electrical heater and configured to:
      determine whether the HRSG is operating in a start-up mode, a normal operating mode, or a shutdown mode;
      control the electrical heater to a first temperature output in response to determining that the HRSG is operating in the start-up mode;
      control the electrical heater to a second temperature output in response to determining that the HRSG is operating in the normal operating mode, wherein the first temperature output is different than the second temperature output; and
      control the electrical heater to a third temperature output in response to determining that the HRSG is operating in the shutdown mode, wherein the third temperature output is different than the second temperature output.

13. The HRSG of claim 12, comprising a valve configured to receive the fluid after the fluid passes through the structure, wherein the controller is configured to instruct the valve to direct the fluid toward a first process in response to determining that the HRSG is operating in the normal operating mode, and wherein the controller is configured to instruct the valve to direct the fluid toward a second process different than the first process in response to determining that the HRSG is operating in the shutdown mode.

14. The HRSG of claim 13, wherein the first process comprises directing the fluid into a steam turbine to drive the steam turbine.

15. The HRSG of claim 13, wherein the second process comprises directing the fluid into a plenum of a steam turbine such that the fluid seals the steam turbine.

16. The HRSG of claim 12, wherein the structure comprises a drum in fluid communication with a high pressure evaporator or an intermediate pressure evaporator, wherein the electrical heater heats the fluid in the drum.

17. The HRSG of claim 16, wherein the HRSG does not comprise an auxiliary boiler for heating the fluid.

18. A control system of a heat recovery steam generator (HRSG) having an electrical heater in or on a structure of the HRSG, the control system comprising:

a valve configured to receive a fluid after the fluid passes through a fluid path of the HRSG; and at least one controller configured to:
 determine whether the HRSG is operating in a start-up mode, a normal operating mode, or a shutdown mode;
 control the electrical heater to provide heat to the fluid in the fluid path at a first temperature output in response to determining that the HRSG is operating in the start-up mode;
 control the electrical heater to provide heat to the fluid in the fluid path at a second temperature output in response to determining that the HRSG is operating in the normal operating mode, wherein the first temperature output is different than the second temperature output;
 control the electrical heater to provide heat to the fluid in the fluid path at a third temperature output in response to determining that the HRSG is operating in the shutdown mode, wherein the third temperature output is different than the second temperature output; and
 control the valve to direct the fluid towards a first process in response to determining that the HRSG is operating in the normal operating mode and a second process different than the first process in response to determining that the HRSG is operating in the start-up mode, shutdown mode, or both.

19. The control system of claim 18, wherein the first process comprises directing the fluid into a steam turbine for driving the steam turbine, and wherein the second process comprises directing the fluid into the steam turbine for sealing a region of the steam turbine.

* * * * *